(12) United States Patent
Kato

(10) Patent No.: US 11,658,602 B2
(45) Date of Patent: May 23, 2023

(54) MOTOR DRIVE DEVICE AND MOTOR DRIVE SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masahiro Kato, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/183,750

(22) Filed: Feb. 24, 2021

(65) Prior Publication Data
US 2021/0320610 A1    Oct. 14, 2021

(30) Foreign Application Priority Data

Apr. 8, 2020 (JP) .............................. JP2020-070004

(51) Int. Cl.
*H02P 8/36* (2006.01)
*H02P 29/024* (2016.01)

(52) U.S. Cl.
CPC ................................ *H02P 29/027* (2013.01)

(58) Field of Classification Search
CPC ....... H02P 29/027; H02P 29/0243; H02P 8/36
See application file for complete search history.

(56) References Cited

U.S. PATENT DOCUMENTS

| 11,303,233 | B2* | 4/2022 | Hisatomi | H02P 29/028 |
| 2009/0302792 | A1* | 12/2009 | Osada | H02P 29/032 318/400.29 |
| 2012/0068648 | A1* | 3/2012 | Kawakami | H02P 6/14 318/400.29 |
| 2015/0214882 | A1* | 7/2015 | Suzuki | H02P 29/0241 318/400.27 |
| 2019/0288612 | A1 | 9/2019 | Kato | |

FOREIGN PATENT DOCUMENTS

| JP | 2005080417 A | 3/2005 | |
| JP | 3146815 B2 | 11/2008 | |
| JP | 5892790 B2 | 3/2016 | |
| WO | WO-2018147403 A1 * | 8/2018 | B62D 5/046 |

* cited by examiner

*Primary Examiner* — Thai T Dinh
(74) *Attorney, Agent, or Firm* — Holtz, Holtz & Volek PC

(57) ABSTRACT

A motor drive device of an embodiment includes a first drive circuit, a second drive circuit, a first detection circuit, a second detection circuit, a third detection circuit, a fourth detection circuit, and an output circuit. The first drive circuit drives a first phase of a motor. The second drive circuit drives a second phase of the motor. The first detection circuit detects a first anomaly of the first phase. The second detection circuit detects the first anomaly of the second phase. The third detection circuit detects a second anomaly of the first phase. The fourth detection circuit detects the second anomaly of the second phase. The output circuit outputs an occurred anomaly as a flag signal based on results of detection by the first to fourth detection circuits.

18 Claims, 3 Drawing Sheets

FIG. 3

|  | DIAG32 | DIAG33 | DIAG34 |
|---|---|---|---|
| NORMAL | Hi-Z | Hi-Z | Hi-Z |
| OVERCURRENT DETECTION (DEDICATED TO PHASE A) | L | Hi-Z | Hi-Z |
| OVERCURRENT DETECTION (DEDICATED TO PHASE B) | Hi-Z | L | Hi-Z |
| OPEN LOAD DETECTION (DEDICATED TO PHASE A) | L | Hi-Z | L |
| OPEN LOAD DETECTION (DEDICATED TO PHASE B) | Hi-Z | L | L |
| OVERHEATING DETECTION (ENTIRE IC) | L | L | L |

FIG. 4

|  | DIAG32 | DIAG33 | DIAG34 |
|---|---|---|---|
| NORMAL | Hi-Z | Hi-Z | Hi-Z |
| OVERCURRENT DETECTION (DEDICATED TO PHASE A) | L | Hi-Z | Hi-Z |
| OVERCURRENT DETECTION (DEDICATED TO PHASE B) | Hi-Z | L | Hi-Z |
| OPEN LOAD DETECTION (DEDICATED TO PHASE A) | L | Hi-Z | L |
| OPEN LOAD DETECTION (DEDICATED TO PHASE B) | Hi-Z | L | L |
| OVERHEATING DETECTION (ENTIRE IC) | L | L | L |
| OPEN LOAD DETECTION (PHASE B) →OVERCURRENT DETECTION (PHASE A) | Hi-Z | Hi-Z | L |
| OPEN LOAD DETECTION (PHASE A) →OVERCURRENT DETECTION (PHASE B) | L | L | Hi-Z |

MOTOR DRIVE DEVICE AND MOTOR DRIVE SYSTEM

CROSS-REFERENCE TO RELATED APPLICATIONS

This application is based upon and claims the benefit of priority from the prior Japanese Patent Application No. 2020-070004 filed on Apr. 8, 2020; the entire contents of which are incorporated herein by reference.

FIELD

An embodiment of the present invention relates to a motor drive device and a motor drive system.

BACKGROUND

Conventionally, a semiconductor device, such as a motor drive device, used on board a vehicle has been required to have high reliability and typically had an anomaly detection function. For example, a typical anomaly detection function detects overcurrent (short-circuit defect) and detects open load (open defect). The motor drive device detects an anomaly and transmits a detection result to an external micro control unit. The micro control unit controls the motor drive device to stop operation or perform safe operation.

It is effective for safety improvement that the motor drive device detects in which coil phase an anomaly has occurred when driving a motor including coils of a plurality of phases, such as a stepping motor.

BRIEF DESCRIPTION OF THE DRAWINGS

FIG. 3 is a diagram illustrating an example of a relation among each anomaly state and anomaly detection flag signals output from output terminals; and FIG. 4 is a diagram illustrating another example of the relation among each anomaly state and anomaly detection flag signals output from output terminals.

DETAILED DESCRIPTION

A motor drive device of an embodiment includes a first drive circuit, a second drive circuit, a first detection circuit, a second detection circuit, a third detection circuit, a fourth detection circuit, and an output circuit. The first drive circuit drives a first phase of a motor. The second drive circuit drives a second phase of the motor. The first detection circuit detects a first anomaly of the first phase. The second detection circuit detects the first anomaly of the second phase. The third detection circuit detects a second anomaly of the first phase. The fourth detection circuit detects the second anomaly of the second phase. The output circuit outputs an occurred anomaly as a flag signal based on results of detection by the first to fourth detection circuits.

The embodiment will be described below in detail with reference to the accompanying drawings.

Figure 1:
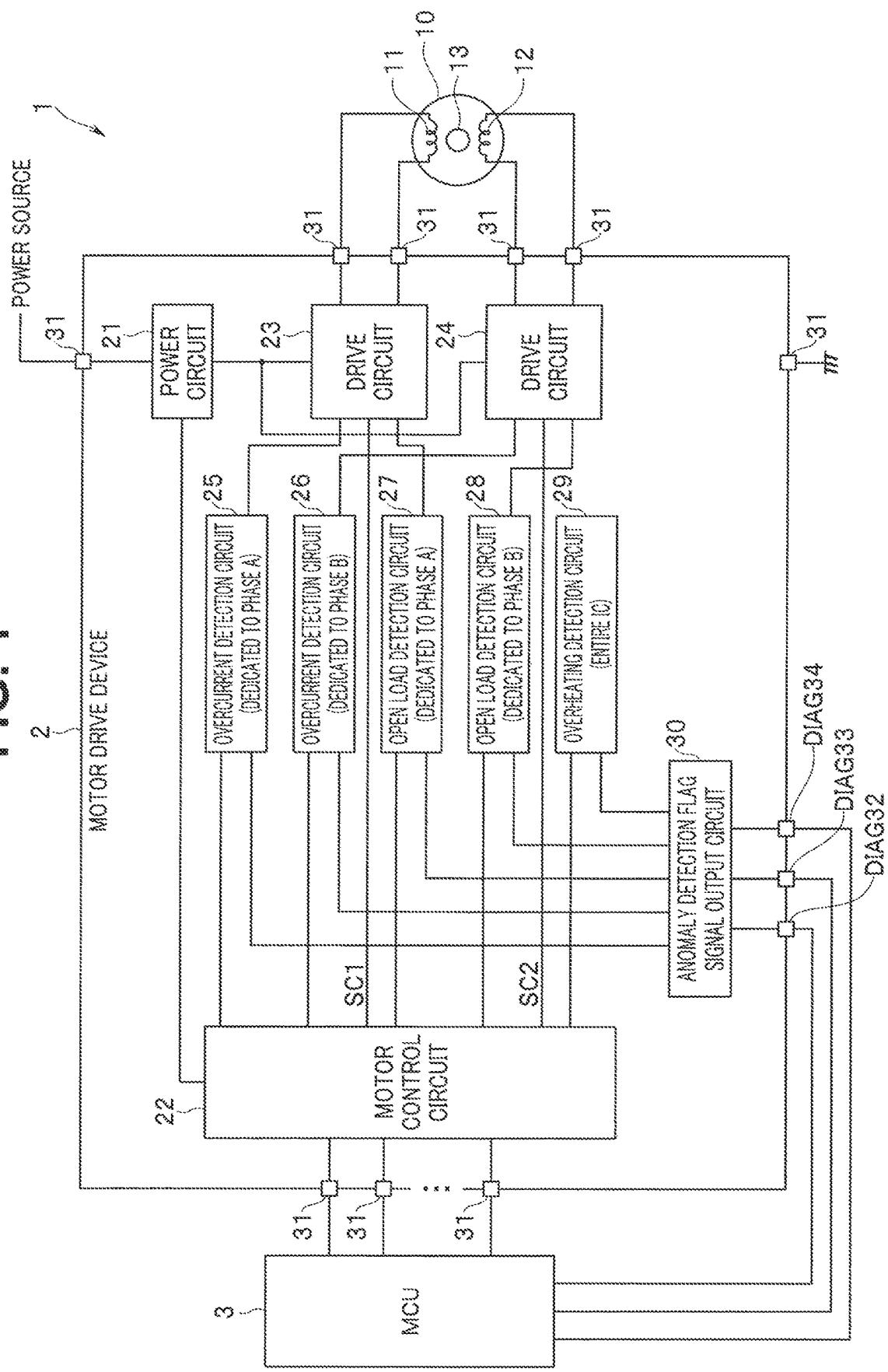
FIG. 1 is a diagram illustrating the configuration of a motor drive system of an embodiment.

FIG. 1 is a diagram illustrating the configuration of a motor drive system of the embodiment. This motor drive system 1 includes a motor drive device 2, a micro control unit (hereinafter referred to as MCU) 3, and a stepping motor 10.

The stepping motor 10 includes a coil 11 of Phase A (the first phase), a coil 12 of Phase B (the second phase), and a rotor 13. Note that the stepping motor 10 is not limited to two phases but may have three or more phases. The motor drive system 1 may include a brushless motor of two or more phases in place of the stepping motor 10.

The motor drive device 2 is a device configured to drive the stepping motor 10 under control of the MCU 3. The MCU 3 outputs a signal for controlling the motor drive device 2.

The motor drive device 2 includes a power circuit 21, a motor control circuit 22, drive circuits 23 and 24, overcurrent detection circuits 25 and 26, open load detection circuits 27 and 28, an overheating detection circuit 29, an anomaly detection flag signal output circuit 30, and a plurality of input-output terminals 31. Among the input-output terminals, three terminals through which the anomaly detection flag signal output circuit 30 outputs flag signals indicating anomaly detection are referred to as output terminals DIAG32, DIAG33, and DIAG34.

The power circuit 21 is supplied with power from a commercial power source, a battery, or the like (not illustrated). The power circuit 21 converts the supplied power into operation voltage of each circuit and supplies the converted power.

The motor control circuit 22 outputs control signals SC1 and SC2 for controlling the stepping motor 10 to the drive circuits 23 and 24. The drive circuits 23 and 24 drive the stepping motor 10 based on the control signals SC1 and SC2. More specifically, the drive circuit 23 drives the coil 11 of Phase A based on the control signal SC1 and the drive circuit 24 drives the coil 12 of Phase B based on the control signal SC2.

Figure 2:
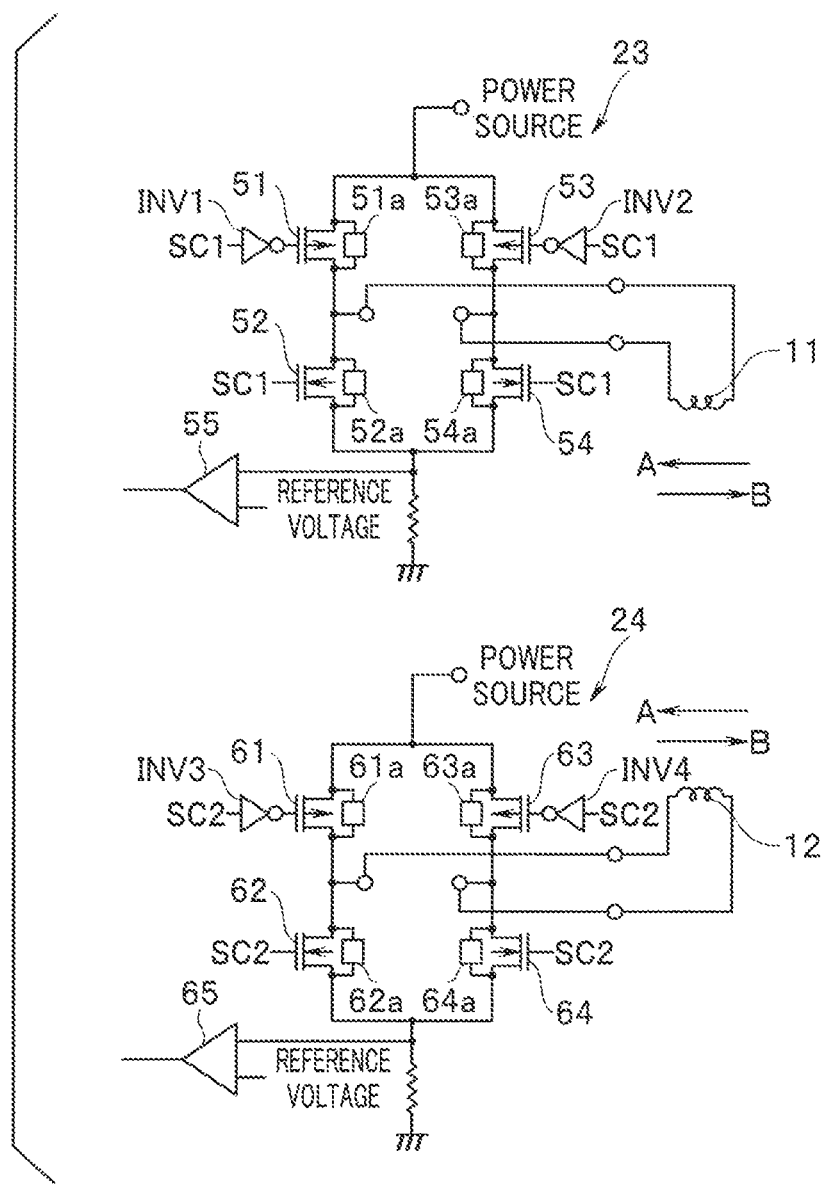
FIG. 2 is a diagram illustrating the configuration of a drive circuit.

FIG. 2 is a diagram illustrating the configuration of each drive circuit. The drive circuit 23 includes, between a power source and ground, a pair of a FET 51 and a FET 52 connected in series with each other, and a pair of a FET 53 and a FET 54 connected in series with each other. The pairs are connected in parallel with each other. The drive circuit 23 configures a H bridge circuit of Phase A in which the coil 11 is connected between a connection point of the FETs 51 and 52 and a connection point of the FETs 53 and 54.

Detection circuits 51a to 54a for overcurrent detection are provided in parallel to the FETS 51 to 54, respectively. The detection circuits 51a to 54a each include a sensor configured to measure current flowing through the corresponding one of the FETs 51 to 54 and a comparison circuit configured to compare the measured current with reference current. The detection circuits 51a to 54a each compare the measured current with the reference current and output an overcurrent detection result to the overcurrent detection circuit 25. For example, the detection circuits 51a to 54a each output an H-level signal to the overcurrent detection circuit 25 when the measured current is larger than the reference current, or output an L-level signal to the overcurrent detection circuit 25 when the measured current is equal to or smaller than the reference current.

A comparator 55 for detecting an open defect anomaly is connected at a connection point of the FETs 52 and 54 with the ground. Voltage supplied to the coil 11 is input to one input terminal of the comparator 55, and reference voltage is input to the other input terminal. The comparator 55 compares the voltage supplied to the coil 11 with the reference voltage and outputs an open load detection result. For example, the comparator 55 outputs an H-level signal to the open load detection circuit 27 when the supplied voltage is higher than the reference voltage, or outputs an L-level signal to the open load detection circuit 27 when the supplied voltage is equal to or lower than the reference voltage.

Similarly, the drive circuit 24 includes, between a power source and the ground, a pair of FETs 61 and 62 connected in series with each other and a pair of FETs 63 and 64 connected in series with each other. The pairs are connected in parallel with each other. The drive circuit 24 configures a H bridge circuit of Phase B in which the coil 12 is connected between a connection point of the FETs 61 and 62 and a connection point of the FETs 63 and 64.

Detection circuits 61a to 64a for overcurrent detection are provided in parallel to the FETs 61 to 64, respectively. The detection circuits 61a to 64a each include a sensor configured to measure current flowing through the corresponding one of the FETs 61 to 64 and a comparison circuit configured to compare the measured current with reference current. The detection circuits 61a to 64a each compare the measured current with the reference current and output an overcurrent detection result to the overcurrent detection circuit 26. For example, the detection circuits 61a to 64a each output an H-level signal to the overcurrent detection circuit 26 when the measured current is larger than the reference current, or output an L-level signal to the overcurrent detection circuit 26 when the measured current is equal to or smaller than the reference current.

A comparator 65 for detecting an open detect anomaly is connected at a connection point of the FETs 62 and 64 with the ground. Voltage supplied to the coil 12 is input to one input terminal of the comparator 65, and reference voltage is input to the other input terminal. The comparator 65 compares the voltage supplied to the coil 12 with the reference voltage and outputs an open load detection result. For example, the comparator 65 outputs an H-level signal to the open load detection circuit 28 when the supplied voltage is higher than the reference voltage, or outputs an L-level signal to the open load detection circuit 28 when the supplied voltage is lower than the reference voltage.

The control signal SC1 from the motor control circuit 22 is input to the FETs 52 and 54, and the control signal SC1 inverted by inverters INV1 and INV2 is input to the FETs 51 and 53. When the FETs 51 and 54 are turned on by the control signal SC1, current flows through the coil 11 in the direction of Arrow A. When the FETs 52 and 53 are turned on by the control signal SC1, current flows through the coil 11 in the direction of Arrow B.

Similarly, the control signal SC2 from the motor control circuit 22 is input to the FETs 62 and 64, and the control signal SC2 inverted by inverters INV3 and INV4 is input to the FETs 61 and 63. When the FETs 61 and 64 are turned on by the control signal SC2, current flows through the coil 12 in the direction of Arrow B. When the FETs 62 and 63 are turned on by the control signal SC2, current flows through the coil 12 in the direction of Arrow A.

The drive circuits 23 and 24 change, in accordance with the control signals SC1 and SC2, the direction of a magnetic field generated by switching the direction of current flowing through the coils 11 and 12, and accordingly, rotate the rotor 13.

The overcurrent detection circuit 25 as the first detection circuit detects an overcurrent anomaly (short-circuit defect) of the coil 11 and a path related to the coil 11 based on detection results from the detection circuits 51a to 54a. When any of the terminals of the coil 11 is short-circuited with a power source line (power source short-circuit) or short-circuited with a ground line (ground short-circuit) or when wires connected with the coil 11 are short-circuited, two points having potential difference therebetween are connected and large current flows. The overcurrent detection circuit 25 detects a short-circuit defect when current larger than the reference current is detected by the detection circuits 51a to 54a.

The overcurrent detection circuit 26 as the second detection circuit detects an overcurrent anomaly (short-circuit defect) of the coil 12 and a path related to the coil 12 based on detection results from the detection circuits 61a to 64a. The overcurrent detection circuit 26 detects a short-circuit defect when current larger than the reference current is detected by the detection circuits 61a to 64a.

The overcurrent detection circuits 25 and 26 output detection results to the motor control circuit 22 and the anomaly detection flag signal output circuit 30. For example, the overcurrent detection circuits 25 and 26 each output an L-level signal when having detected no short-circuit defect anomaly, or output an H-level signal when having detected a short-circuit defect anomaly.

The open load detection circuit 27 as the third detection circuit detects an open load anomaly (open defect) of the coil 11 and the path related to the coil 11 based on a result of detection by the comparator 55. When breaking occurs to the coil 11 and a wire (power source line) connected with the coil 11, no current flows between a power source and the ground. Accordingly, 0 V is input to the one input terminal of the comparator 55. The open load detection circuit 27 detects an open defect when voltage equal to or lower than the reference voltage is detected by the comparator 55.

The open load detection circuit 28 as the fourth detection circuit detects an open load anomaly (open defect) of the coil 12 and the path related to the coil 12 based on a result of detection by the comparator 65. The open load detection circuit 28 detects an open defect when voltage equal to or lower than the reference voltage is detected by the comparator 65.

The open load detection circuits 27 and 28 output detection results to the motor control circuit 22 and the anomaly detection flag signal output circuit 30. For example, the open load detection circuits 27 and 28 each output an L-level signal when having detected no anomaly, or output an H-level signal when having detected an anomaly.

The overheating detection circuit 29 detects the temperature of the motor drive device 2 and outputs a result of detection of whether the motor drive device 2 is superheated to the motor control circuit 22 and the anomaly detection flag signal output circuit 30. For example, the overheating detection circuit 29 outputs an L-level signal when having detected no overheating anomaly, or outputs an H-level signal when having detected an overheating anomaly.

The motor control circuit 22 controls the motor drive device 2 to stop operation or perform secure operation in accordance with results of detection by the overcurrent detection circuits 25 and 26, the open load detection circuits 27 and 28, and the overheating detection circuit 29. For example, when results of detection by the overcurrent detection circuits 25 and 26 and the overheating detection circuit 29 have anomalies, the temperature of the motor drive device 2 would increase and an ignition would occur, and thus the motor control circuit 22 controls the motor drive device 2 to stop. When results of detection by the open load detection circuits 27 and 28 have anomalies, the motor drive device 2 is not likely to get ignited, and thus the motor control circuit 22 does not necessarily need to stop the motor drive device 2 and controls the motor drive device 2 to perform secure operation.

The anomaly detection flag signal output circuit 30 as the output circuit outputs a flag signal in accordance with results of detection by the overcurrent detection circuits 25 and 26, the open load detection circuits 27 and 28, and the overheating detection circuit 29 to the MCU 3 through the output terminals DIAG32, DIAG33, and DIAG34. The MCU 3 can recognize, based on the flag signal, in which of Phases A and B a short-circuit defect or an open defect has occurred.

FIG. 3 is a diagram illustrating an example of a relation among each anomaly state and anomaly detection flag signals output from output terminals. The output terminals DIAG32, DIAG33, and DIAG34 are at Hi-Z in normal operation, and output L or remain at Hi-Z in anomaly detection. The anomaly detection flag signal output circuit 30 has a circuit configuration that generates output signals in a truth table in FIG. 3. The output terminals DIAG32, DIAG33, and DIAG34 remain at Hi-Z when all results of detection by the overcurrent detection circuits 25 and 26, the open load detection circuits 27 and 28, and the overheating detection circuit 29 are normal.

When a result of detection by the overcurrent detection circuit 25 is anomalous, the anomaly detection flag signal output circuit 30 outputs L through the output terminal DIAG32 and the output terminals DIAG33 and DIAG34 remain at Hi-Z.

When a result of detection by the overcurrent detection circuit 26 is anomalous, the output terminals DIAG32 and DIAG34 remain at Hi-Z, and the anomaly detection flag signal output circuit 30 outputs L through the output terminal DIAG33.

When a result of detection by the open load detection circuit 27 is anomalous, the anomaly detection flag signal output circuit 30 outputs L through the output terminals DIAG32 and DIAG34 and the output terminal DIAG33 remains at Hi-Z.

When a result of detection by the open load detection circuit 28 is anomalous, the output terminal DIAG32 remains at Hi-Z and the anomaly detection flag signal output circuit 30 outputs L through the output terminals DIAG33 and DIAG34.

When a result of detection by the overheating detection circuit 29 is anomalous, the anomaly detection flag signal output circuit 30 outputs L through the output terminals DIAG32, DIAG33, and DIAG34.

In this manner, the motor drive device 2 of the present embodiment includes the overcurrent detection circuit 25 and the open load detection circuit 27, which are dedicated to Phase A, and the overcurrent detection circuit 26 and the open load detection circuit 28, which are dedicated to Phase B, and notifies the external MCU 3 of flag signals in accordance with results of detection by the overcurrent detection circuits 25 and 26 and the open load detection circuits 27 and 28. As a result, the MCU 3 can recognize in which of Phases A and B a short-circuit defect or an open defect has occurred.

With the configuration of the present embodiment, an external current detection circuit does not need to be provided separately from the motor drive device 2 nor need a complicate sequence of, for example, monitoring current while individually exciting a coil of each phase. Accordingly, with the motor drive device of the present embodiment, it is possible to easily detect which of a plurality of phases is anomalous.

Note that since the output terminals DIAG32, DIAG33, and DIAG34 are provided in the present embodiment, the anomaly detection flag signal output circuit 30 can notify the MCU 3 of eight states at maximum. The anomaly detection flag signal output circuit 30 notifies the MCU 3 of six states in the example illustrated in FIG. 3, but may notify the MCU 3 of eight states as illustrated in FIG. 4.

FIG. 4 is a diagram illustrating another example of the relation among each anomaly state and anomaly detection flag signals output from output terminals. FIG. 4 lists two anomaly detection combinations in addition to the six states in FIG. 3.

When a result of detection by the overcurrent detection circuit 25 has become anomalous after a result of detection by the open load detection circuit 28 has become anomalous, the output terminals DIAG32 and DIAG33 remain at Hi-Z and the anomaly detection flag signal output circuit 30 outputs L through the output terminal DIAG34.

When a result of detection by the overcurrent detection circuit 26 has become anomalous after a result of detection by the open load detection circuit 27 has become anomalous, the anomaly detection flag signal output circuit 30 outputs L through the output terminals DIAG32 and DIAG33 and the output terminal DIAG34 remains at Hi-Z.

In an open defect anomaly, operation of the motor drive device 2 does not necessarily need to be stopped. Thus, the anomaly detection flag signal output circuit 30 outputs a flag signal indicating anomaly detection to the MCU 3 when a short-circuit defect anomaly has occurred after an open defect anomaly. Accordingly, the anomaly detection flag signal output circuit 30 can notify the MCU 3 of the occurrence order of anomalies.

Note that although in which phase of the two-phase stepping motor 10 an anomaly has occurred is detected in the present embodiment, it is possible to detect in which phase of a stepping motor having three or more phases an anomaly has occurred.

An overcurrent detection circuit and an open load detection circuit are provided for each phase, and four or more output terminals connected with the anomaly detection flag signal output circuit 30 are provided. When provided with the four or more output terminals, the anomaly detection flag signal output circuit 30 can notify the MCU 3 of 16 states at maximum. Accordingly, the MCU 3 can recognize to which phase an anomaly has occurred.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A motor drive device comprising:
   a first drive circuit configured to drive a first phase of a motor;
   a second drive circuit configured to drive a second phase of the motor;
   a first detection circuit configured to detect occurrence of a first type of anomaly in a path of the first phase, the first type of anomaly being an overcurrent anomaly;
   a second detection circuit configured to detect occurrence of the first type of anomaly in a path of the second phase;

a third detection circuit configured to detect occurrence of a second type of anomaly in the path of the first phase, the second type of anomaly being an open load anomaly;

a fourth detection circuit configured to detect occurrence of the second type of anomaly in the path of the second phase; and an output circuit configured to output information including both (i) the path of the first phase or the second phase in which an anomaly of the first or second type is detected to have occurred and (ii) the type of the anomaly detected to have occurred, as a flag signal based on results of detection by the first to fourth detection circuits.

2. The motor drive device according to claim 1, wherein the output circuit outputs a plurality of flag signals corresponding to respective results of detection by the first to fourth detection circuits.

3. The motor drive device according to claim 1, further comprising a control circuit configured to output first and second control signals for controlling the motor to the first and second drive circuits based on results of detection by the first to fourth detection circuits.

4. The motor drive device according to claim 3, wherein:
the first drive circuit drives the first phase of the motor based on the first control signal, and
the second drive circuit drives the second phase of the motor based on the second control signal.

5. The motor drive device according to claim 1, wherein:
the first drive circuit includes, between a power source and ground, a pair of first and second transistors connected in series with each other and a pair of third and fourth transistors connected in series with each other, the pairs being connected in parallel with each other, and
the second drive circuit includes, between the power source and the ground, a pair of fifth and sixth transistors connected in series with each other and a pair of seventh and eighth transistors connected in series with each other, the pairs being connected in parallel with each other.

6. The motor drive device according to claim 5, wherein first, second, third, fourth, fifth, sixth, seventh, and eighth detection circuits for overcurrent detection are provided in parallel to the first, second, third, fourth, fifth, sixth, seventh, and eighth transistors, respectively.

7. The motor drive device according to claim 6, wherein:
the first detection circuit detects occurrence of the first type of anomaly based on results of detection by the first, second, third, and fourth detection circuits for overcurrent detection, and
the second detection circuit detects occurrence of the first type of anomaly based on results of detection by the fifth, sixth, seventh, and eighth detection circuits for overcurrent detection.

8. The motor drive device according to claim 5, wherein:
a first comparator is connected at a connection point of the second and fourth transistors with the ground, and
a second comparator is connected at a connection point of the sixth and eighth transistors with the ground.

9. The motor drive device according to claim 8, wherein:
the third detection circuit detects occurrence of the second type of anomaly based on a result of detection by the first comparator, and
the fourth detection circuit detects occurrence of the second type of anomaly based on a result of detection by the second comparator.

10. A motor drive system comprising:
a motor drive device including a first drive circuit, a second drive circuit, a first detection circuit, a second detection circuit, a third detection circuit, a fourth detection circuit, and an output circuit, the first drive circuit being configured to drive a first phase of a motor, the second drive circuit being configured to drive a second phase of the motor, the first detection circuit being configured to detect occurrence of a first type of anomaly in a path of the first phase, the second detection circuit being configured to detect occurrence of the first type of anomaly in a path of the second phase, the third detection circuit being configured to detect occurrence of a second type of anomaly in the path of the first phase, the fourth detection circuit being configured to detect occurrence of the second type of anomaly in the path of the second phase, the first type of anomaly being an overcurrent anomaly, the second type of anomaly being an overcurrent anomaly, and the output circuit being configured to output information including both (i) the path of the first phase or the second phase in which an anomaly of the first or second type is detected to have occurred and (ii) the type of the anomaly detected to have occurred, as a flag signal based on results of detection by the first to fourth detection circuits; and
a micro control unit configured to control the motor drive device based on the flag signal.

11. The motor drive system according to claim 10, wherein the output circuit outputs a plurality of flag signals corresponding to respective results of detection by the first to fourth detection circuits.

12. The motor drive system according to claim 10, further comprising a control circuit configured to output first and second control signals for controlling the motor to the first and second drive circuits based on results of detection by the first to fourth detection circuits.

13. The motor drive system according to claim 12, wherein:
the first drive circuit drives the first phase of the motor based on the first control signal, and
the second drive circuit drives the second phase of the motor based on the second control signal.

14. The motor drive system according to claim 10, wherein:
the first drive circuit includes, between a power source and ground, a pair of first and second transistors connected in series with each other and a pair of third and fourth transistors connected in series with each other, the pairs being connected in parallel with each other, and
the second drive circuit includes, between the power source and the ground, a pair of fifth and sixth transistors connected in series with each other and a pair of seventh and eighth transistors connected in series with each other, the pairs being connected in parallel with each other.

15. The motor drive system according to claim 14, wherein first, second, third, fourth, fifth, sixth, seventh, and eighth detection circuits for overcurrent detection are provided in parallel to the first, second, third, fourth, fifth, sixth, seventh, and eighth transistors, respectively.

16. The motor drive system according to claim 15, wherein the first detection circuit detects occurrence of the first type of anomaly based on results of detection by the first, second, third, and fourth detection circuits for overcurrent detection, and the second detection circuit detects occurrence of the first type of anomaly based on results of detection by the fifth, sixth, seventh, and eighth detection circuits for overcurrent detection.

17. The motor drive system according to claim 14, wherein:
   a first comparator is connected at a connection point of the second and fourth transistors with the ground, and
   a second comparator is connected at a connection point of the sixth and eighth transistors with the ground.

18. The motor drive system according to claim 17, wherein:
   the third detection circuit detects occurrence of the second type of anomaly based on a result of detection by the first comparator, and
   the fourth detection circuit detects occurrence of the second type of anomaly based on a result of detection by the second comparator.

* * * * *